May 12, 1970 H. P. MATTHEWS 3,511,293
PNEUMATIC TIRES
Filed March 20, 1968 3 Sheets-Sheet 2
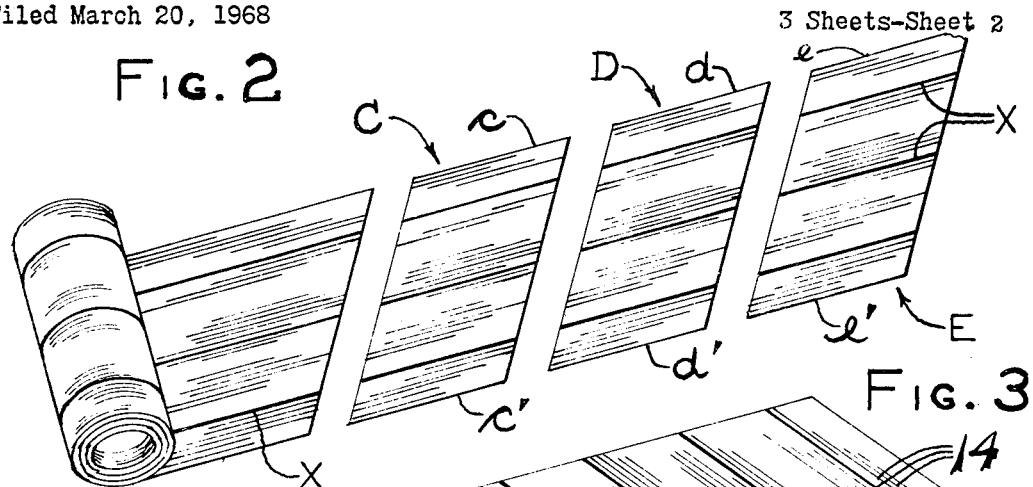
Fig. 2
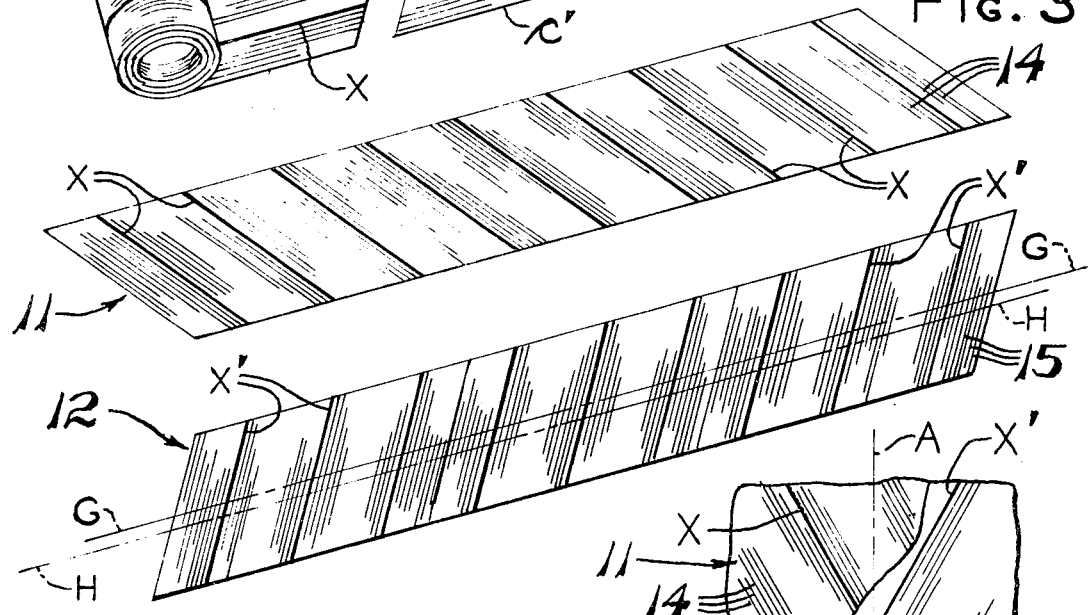
Fig. 3
Fig. 4 Fig. 5
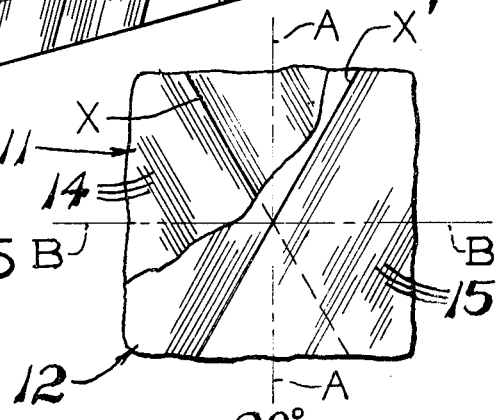
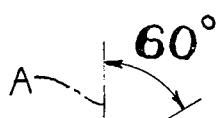
Fig. 6
Fig. 7

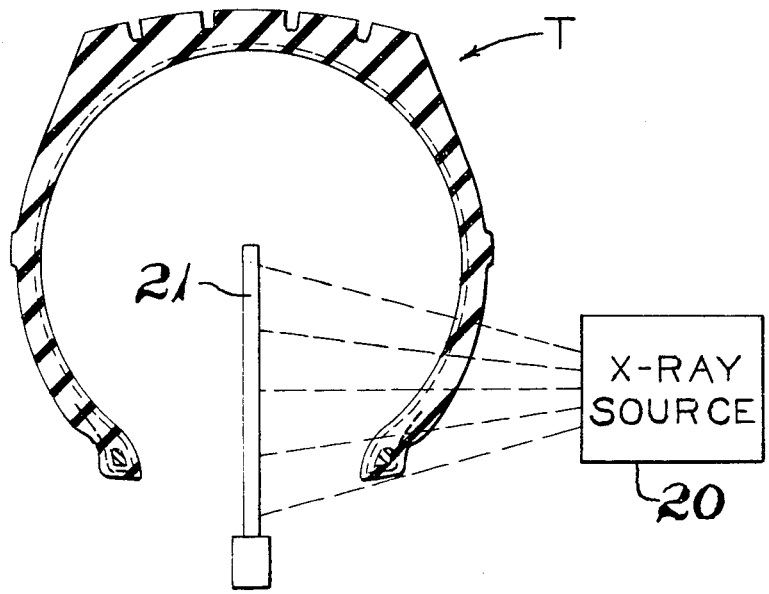
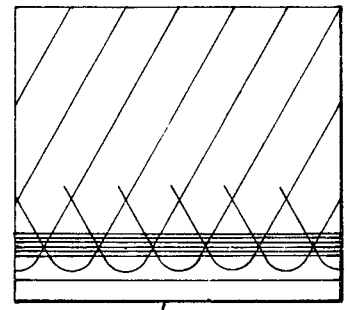
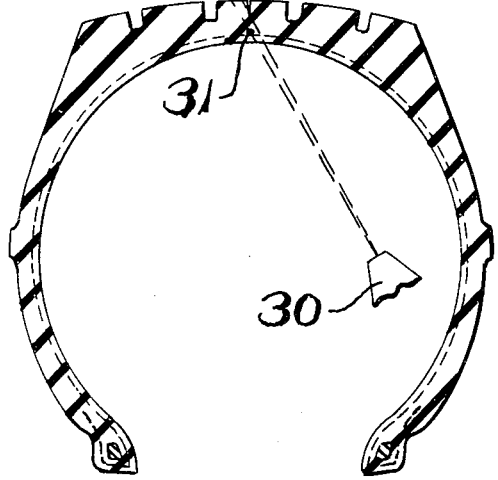

United States Patent Office 3,511,293
Patented May 12, 1970

3,511,293
PNEUMATIC TIRES
Harry P. Matthews, Miami, Okla., assignor to The B. F. Goodrich Company, New York, N.Y., a corporation of New York
Filed Mar. 20, 1968, Ser. No. 718,973
Int. Cl. B60c 9/06, 9/12
U.S. Cl. 152—330                                    11 Claims

ABSTRACT OF THE DISCLOSURE

A tire and method of analyzing a tire which has built into it X-ray opaque cords which lie in the same direction as the other cords in the fabric such that an X-ray of the tire will aid in the analysis of cord angle, the tread thickness, and construction features thereof.

BACKGROUND OF THE INVENTION

This invention relates to a tire and more particularly to a novel pneumatic tire, and the method of making such tire.

In the manufacture of pneumatic tires, a thin sheet or layer or uncured rubber-like material which is conventionally referred to as fabric or building ply, has parallel fabric, glass, plastic cord members embedded therein for giving rigidity to the tire body. The fabric is prepared in rolls such that each cord travels the entire length of a mill roll. The mill roll is introduced into a calendar for the purpose of embedding the parallel cords in a rubber-like material after which such fabric or building ply is bias cut into sections of fabric which are then spliced end to end to give a ply stock with the cords therein located at a desired bias angle relative to the longitudinal center line of the ply stock. Layers of fabric often referred to as plies are applied by various means to a tire building drum with the respective end portions extending over the sides of the drum, which end portions are turned radially inwardly to lie against the outer shoulder of the tire building drum. The layers of fabric are applied to the drum in such a manner that cord members of overlapping plies criss-cross with respect to the cord members above or below. The tire beads are then set against the inturned plies and the inturned ply portions are pulled out and turned up and around the beads. In the case of multi-bead tires, this process is repeated until all beads have been set. Further plies are laid on the drum and their edges are turned down and around the bead to overlay the plies previously turned up. Chaffer strips, sidewalls, and tread stock are additionally positioned on the tire carcass and stitched onto the carcass. Such carcass is substantially a flat band, wherein the angle as measured between the cords and the circumferential line around the crown of the tire in the case of pneumatic passenger tires is approximately 60°. After removal of the green tire from the tire building drum, such green tire is given a toroidal shape either during the vulcanizing process or on a second machine prior to vulcanization, wherein the angle after vulcanization as measured between the cords and the circumferential line around the crown of the passenger car tire is now approximately 30 to 35°. It is important to control such pantographing or change in the bias angle of the tire cord. In the event the bias angle of the vulcanized tire is less than the designed angle, the inflated tire will be of a smaller diameter and larger cross section than it was designed for, giving a harder ride; whereas, if the bias angle of the vulcanized tire is greater than the designed angle, the inflated tire will be of a larger diameter than designed for and be of smaller cross section. Therefore, unless uniformity of fabrication was assured then conceivably a car could be driven on four tires all of different diameters although they were classified as having a 15-inch diameter. Thus, uniformity of construction will be affected unless strict adherence to designed characteristics are adhered to. Factors that must be considered in constructing a tire are calculations of the amount of material used, type of material, bias angle, and fabric width. In order to test a tire construction after its fabrication it has been conventional practice to examine the tires built and test their uniformity in cord displacement, tread wear, deflection under load, stability of performance, flexibility of casing and consistency to determine their acceptability. One important test involves the slicing of a portion of the pneumatic tire and measuring the angle at which the tire cord lays with respect to a longitudinal center line, which is the circumferential line around the crown of the tire. Various cuts would be made throughout the tire to determine whether such bias angles were consistent throughout the circumference of the tire. The cutting of tires such as truck tires or in off-the-road tires would be extremely expensive and time consuming. Problems such as correct drum set and ply widths for correct turn up heights would arise when changing from one ply rating to another such as 36 ply rating to a 42 ply rating such as in the manufacture of truck tires wherein plies were used having different specifications. Variations with respect to the type of cord being used, such as changing from an 840/3 cord to 1680/3, i.e. changing from a small diameter size cord to a large size cord and vice-versa, as well as in changing the number of plies cause problems with respect to drum set and ply turn ups. In placing such fabric ply over the tire building drum, a specific width of fabric would be required, however, in shaping of such tire into a toroidal configuration, the degree of bias would be determined by the width of the initial fabric used. If the initial fabric were slightly wider than necessary, the pantographing of the cord during the shaping process would not provide the same bias angle as that of fabric with slightly less than the width necessary. The first one would read less in what is referred to as a loose cord angle whereas the latter would be referred to as a tight cord angle. Many other factors enter into such determination of tightness of cord angle; however, the end product sought was one which would give certain predetermined characteristics. Another test would be to determine the extent to which the respective plies which have been turned out and around the bead had receded or had been pulled down towards the bead section which reflects the bias angle as well as tightness of cord angle and strength of the bead (ply lock) area. If the ply material that was turned around the bead has been pulled back toward the bead excessively during the fabrication of the tire, there will be a lack of casing support in the bead area and premature tire failure as in the case of ply separation.

SUMMARY OF THE INVENTION

It is proposed by the present invention to have several X-ray opaque cords built into the fabric roll at the mill to act as "tracer cord" in ply fabric as such fabric is processed in the factory during the bias cutting procedure and for analysis of the cured tire. These tracer cords could be of a different color than all other cord fabric for ease of visual identification after cutting. X-ray scanning of the bias cutting operation would be used to eliminate miscut angle of stock. During the building of a tire at the tire machine in the case of a ply built tire, or at the band building machine in the case of a band built tire, because visual identification of the tracer cord in each ply can be made at the edge of each bias cut, it is possible to place additional pieces of tracer cord in the form of a number

3 which would correspond to the ply number in the tire on the ply tracer cord. With each ply having its own tracer cords and numbers, identified by X-ray opaque cross cords and X-ray opaque numbers, identification of the plies on a X-ray plate or fluoroscope screen can be verified. The tire mold register leaves a slight rind that shows on an X-ray plate as a line mark, which mark could be used as a center line on the tire and thereby aid in the measuring of the cord angle of the tracers in each ply. The tire mold comes in two halves split on the circumferential center line. During the curing of a tire in such a mold, a fine line of rubber is forced into the crack or space between the mold halves which material increases the overall tire gauge and appears as a line on the X-ray film. In addition, the X-rays of the respective sidewall portion of the tire will indicate the amount of pull down of the respective cords around the bead of the respective tire as indicated above, which was formerly accomplished through the cutting of the actual tire carcass.

In addition, tracer cords could be positioned immediately below the tread portion to permit X-ray examination of such tire section to indicate tread thickness. Another test would be to place two short pieces of X-ray opaque cord across a tracer cord in the ply stock during the building of the tire and after vulcanization through X-ray analysis measure the length of the tracer cord between the two short pieces of cord to determine elongation of the tracer cords which can be converted to stress in the cord of the finished tire.

BRIEF DESCRIPTION OF THE DRAWINGS

FIG. 2 is a perspective view of a roll of fabric showing portions thereof bias cut into fabric sections with X-ray opaque cords shown by a heavier line.

FIG. 3 is a perspective view of bias cut sections spliced together to form a longitudinal ply of stock with X-ray opaque cords shown by a heavier line.

FIG. 4 is a perspective view of bias cut sections spliced together to form a longitudinal ply of stock with the bias angle of the cord in a reverse direction to that shown in FIG. 3; however, such ply of stock shows the ply stock center line as G—G and the band center line as H—H. The X-ray opaque cords are shown as heavier lines.

FIG. 5 is a fragmentary plan view of the body of a cured tire of the invention showing the angle at which the cords of the two plies intersect with line A—A representing the circumferential center line of the tire and line B—B representing the axis of rotation of the tire. The X-ray opaque cords are shown as heavier lines.

FIG. 6 is a diagrammatic plan view of a strip of cord fabric prior to shaping of the tire illustrating the bias angle of the cord with the line A—A representing the circumferential center line of the tire. The X-ray opaque cord is shown as a heavier line.

FIG. 7 is a diagrammatic plan view of the strip of cord fabric at the crown portion of a tire carcass (with tread removed) after the pantographing of the cord fabric due to shaping of the green tire illustrating the finished bias cord angle of the cord fabric with the line A—A representing the circumferential center line of the tire and the X-ray opaque cords as a heavier line.

FIG. 8 is a schematic view of the testing of a tire apparatus showing the tire in cross-sectional view.

FIG. 9 is a diagrammatic view illustrating an X-ray plate showing the X-ray opaque cords in a ply turn up condition.

FIG. 10 is a schematic view of the testing of a tire apparatus showing the tire in cross-sectional view.

4

DESCRIPTION OF THE PREFERRED EMBODIMENTS

Figure 1:
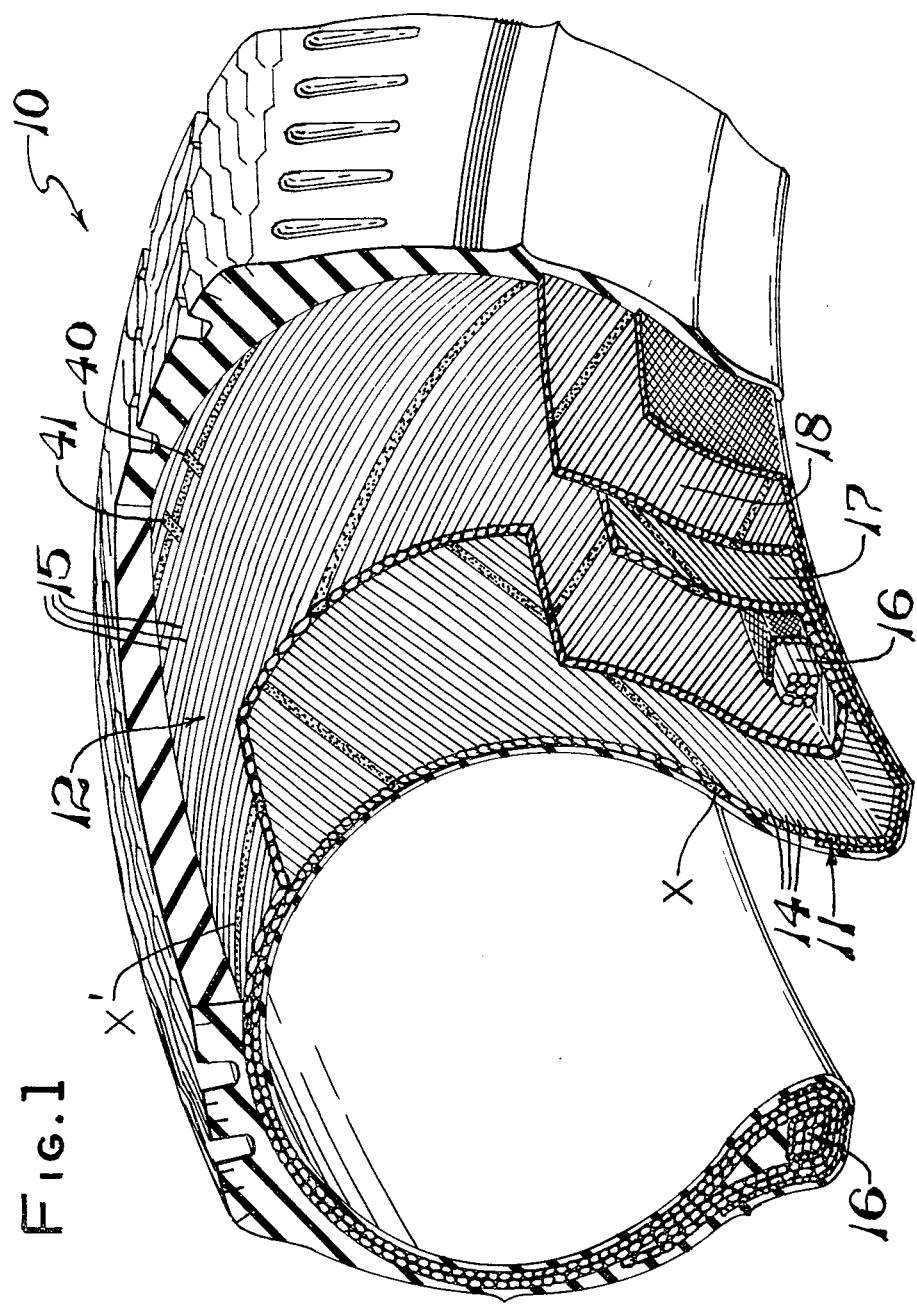
FIG. 1 is a perspective view of stepped down fragmentary sections of a tire embodying the present invention wherein X-ray opaque cords are shown by the stippling to differentiate from the conventional fabric cords which is shown by solid lines.

Referring to the drawings, the numeral 10 indicates generally a conventional two-ply pneumatic tire. The tire as shown comprises a body of two plies 11 and 12 (FIGS. 1, 3 and 4) of rubberized fabric ply, with ply 11 being the first ply and ply 12 being the outer or second ply. As in conventional tire building, the plies are formed of essentially weftless fabric comprising parallel cords 14 as shown in FIG. 1 bonded together with skim coating of rubber or rubber-like material. During the construction of such fabric roll (FIG. 2), three X-ray opaque cords designated X are built into the fabric roll to act as tracer cord. The X-ray opaque cords are shown in the drawings as stippled lines (FIG. 1) or as heavier lines (FIGS. 2–7) for clarity reasons to distinguish such cords from the other conventional fabric cords, as actually the X-ray opaque cords and the other cords are of the same size. Although the invention is shown as containing three cords, more of such cords may be used if desired. Such elongated material is then cut into thin panel sections of bias cut unvulcanized strips designated C, D and E having edges $c$, $c'$, $d$, $d'$ and $e$, $e'$. The edges of the respective panels are then spliced together to form an elongated sheet of material or ply stock 11 (FIG. 3) wherein the cords 14 and the tracer cords X make an acute angle of approximately 60° as measured between the cords and a line extending centrally longitudinally therethrough similar to that shown in FIG. 6. It is to be understood that the example given is only by way of illustration and that the invention herein is not intended to be limited thereby.

When the bias cut is made on a roll of stock or material containing parallel X-ray opaque cords, all the cords in the ply are cut so that if any cord was of a different color, it could be identified at the edge of the ply where the bias cut was made. With rubber coating on the ply stock, the color differential could only be observed at the cut edge. Once the tracer cord is located at the edge of a ply (located by virtue of its distinctive color) it is followed along the cord path until it crosses the ply at a point on the ply that would be at the center line of the tire building drum which will also be the circumferential center line of the tire. After so locating the crossing of the X-ray opaque cord with the center line, a number made from tracer cord may be placed directly on that particular ply tracer cord to identify that particular ply. This is to insure identity of the X-ray opaque tracer cord with the specific ply in which it is located, which is particularly helpful where there are several plies in the constructed tire. An X-ray plate which shows an X-ray opaque tracer cord would also show the number which identifies the ply where the tracer cord actually is.

In constructing a tire, the sheet of material 11 is placed on a cylindrical tire building drum forming an endless circumferentially extending band. A second ply 12 of bias-cut rubberized tire fabric (FIG. 4) is applied over the first ply 11 forming a circumferentially extending band that encompasses the first ply 11, however, the cords 15 of the second ply 12 and the tracer cord X' in the second ply 12 makes an acute angle of 60° as measured between the cords and a line extending centrally longitudinally therethrough, which angle is in a direction opposite to that of the cords of the first ply. As seen in FIG. 1, the ply 11 has its cords criss-crossing the cords of the ply 12, and as shown in FIG. 5, the cords 14 of ply 11 and the cords 15 of ply 12 each forms an angle of 60° with a line A—A that extends circumferentially around the crown of the tire or as measured to a line B—B that is parallel to the tire axis forms an angle of 30°. FIG. 4 shows ply 12 as having a ply center line G—G that is midway between the respective side edges and a band center line H—H. When bands are built onto a tire carcass, the same width of ply is used, but the edges are staggered to provide smooth step off in the tire as seen in FIG. 1. An example of this is in the case of building a four-ply 60-inch wide band, wherein there is a one inch stagger in ply edges to give a final total band width of 63 inches. On this basis, the uppermost band center line would be H—H, assuming a four-ply tire carcass, which would be displaced 1½ inches from the first ply center line or the equivalent of line G—G in the first ply. It is the band center line, not the ply center line, which is desired to fall on the cured tire circumferential center line. The band center line coincides with the circumferential center line of the tire building drum. With the plies on the drum, the respective band edges are turned down over the edges of the drum as is well known in the art and the beads 16—16 are then positioned against the edges thereof. The band edges are then turned up over the beads 16—16 as shown in FIG. 1 designated as 17 and 18 of plies 11 and 12 respectively. Suitable chaffer strips, breaker strips, tread, and sidewall assembly are built into the green tire in a manner clearly understood by those skilled in the art. If desired, an X-ray opaque cord may be placed along the crown line A—A (FIG. 5), which is the circumferential center line, prior to the placement of the tread, to facilitate further analysis of the tire construction. During the forming or shaping of the green tire carcass into a toroidal form prior to vulcanization of as in vulcanization, the cords are subject to a pantographing action wherein the bias angle of the cords change, such that the angle of the cords 14—14 and 15—15 as measured between the cords and the circumferential line A—A around the crown of the tire is now 30° as shown in FIG. 7.

After the construction of such a tire, it is possible to perform various tests to check on uniformity of construction without destroying the tires and permitting a more effective quality control in the fabrication thereof. As viewed in FIG. 7, a test could be performed wherein an X-ray photograph or fluoroscopic examination of the crown portion of the tire would reveal the bias angle that the respective cords made with the circumferential line A—A around the crown of the tire. This angle could be easily and effectively measured on an X-ray film or fluoroscopic screen. Such measurement could involve the use of X-ray opaque cords X and X' either with or without the use of an X-ray opaque cord that extends along the crown line A—A.

In addition an X-ray photograph or fluoroscopic exam of the sidewall portion of the tire would indicate the extent to which the tire cords extended beyond the bead into the sidewall portion which could also indicate the extent to which the plies which have been turned up around the bead had receded or had been pulled down towards the bead section. In testing the sidewall portion of a tire, X-rays from a source 20 (FIG. 8) of a well known type are directed upon the tire T. The X-ray upon passing through the tire strike the vertically disposed sensitive plate or film 21 or a fluoroscopic screen with the resultant exposure thereto in a manner well understood in the art wherein the X-ray opaque cords interfere with the passage of the X-rays while the untreated cords do not interfere with the passage of the X-rays. Upon developing of the film, the image discloses the lay of the X-ray opaque cords which as depicted in FIG. 9 illustrate the angular disposition of the cord and the termination thereof in the sidewall portion of the tire. In a similar manner the positioning of the X-ray source above the tire and directing the rays downwardly therethrough to photograph or examine the tread portion with the film or fluoroscope screen located in a horizontal plane yields a result similar to that depicted as shown in FIG. 5 or 7 with line A—A representing an X-ray opaque cord that extends circumferentially around the tire while X and X' represent the image on the X-ray that corresponds to cords 14 and 15 respectively. The X-ray source and film or fluoroscope screen positions can be reversed. With such film exposed and developed, the measurement of the respective angles is accomplished easily and accurately without resort to the destruction of the tire.

A further test is to use X-ray analysis to determine tread thickness. To achieve this, an X-ray source designated 30 is placed off the center of a tire as shown in FIG. 10 with a tracer cord 31 placed on the uppermost ply prior to the placement of the tread strip so that upon curing of the tire, the tracer cord 31 is located along the circumferentially extending center line of the tire immediately below the tread. By inserting an awl into the tread of a tire to a predetermined depth, the awl point will appear slightly to the right as viewed in FIG. 10 on the X-ray film or the fluoroscopic screen 32. With the fluoroscopic screen or film calibrated, a direct reading is obtained giving the depth of tread. If the awl point were pushed into the tire, past the cord, the awl point would appear to be to the left of the tracer cord as viewed in FIG. 10 or as viewed on the screen by an observer to the right of the tracer cord.

Another test is to place two short pieces of tracer cord 40 and 41 (as shown in FIG. 1) across one of the ply tracer cords X' at a specified known distance apart during the building of the tire. After curing the tire, an X-ray picture or fluoroscopic viewing of the tire, similar to that shown in FIG. 10 except that the X-ray source would be normal to the line connecting the two pieces of tracer cords 40 and 41, would indicate the change in distance between cords 40 and 41 to thereby accurately indicate whether the cords positioned immediately below the tread portion of the tire was loose or tight which in turn affects tire uniformity, quality and cord stress.

As stated above, an X-ray opaque cord formed into a number, or specified number of strips placed on a specific ply would identify that ply and other X-ray opaque cords such as X, X' or cords 40 and 41 in an X-ray film.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A pneumatic tire comprising an annular body of rubber-like material having a central tread portion, edge beads and sidewall portions; said body having closely spaced fabric cords extending from bead to bead into said sidewall portion; and certain ones but less than all of said fabric cords being impregnated with an X-ray opaque material.

2. A pneumatic tire as set forth in claim 1 wherein said certain cords are impregnated with an X-ray opaque compound.

3. A pneumatic tire as set forth in claim 1 wherein a pair of cords impregnated with an X-ray opaque material are located across one of said certain impregnated fabric cords a specified distance prior to vulcanization of said tire.

4. A pneumatic tire as set forth in claim 1 wherein said body has a cord impregnated with a lead compound located therein extending circumferentially around said tire along the center line of the crown portion of the tire and lying in a plane which is normal to the axis of rotation of the tire.

5. A pneumatic tire as set forth in claim 1 wherein said certain ones of said fabric cords are impregnated with an X-ray opaque material that provides a visible tell-tale indication on the edges thereof.

6. A pneumatic tire comprising an annular body of rubber-like material having a central tread portion, edge beads and sidewall portions; said body having plies of rubberized fabric with strands of cords extending therethrough; and certain ones of said cords being impregnated with a material to provide a tell-tale means for indicating angularity of the said cords.

7. A pneumatic tire as set forth in claim 6 wherein said certain ones of said cords are coated with a material with a high atomic number.

8. A pneumatic tire comprising an annular body of rubber-like material having a central tread portion, edge beads and sidewall portions; said body having plies of rubberized fabric with parallel strands of cords extending therethrough; and certain ones of said cords being coated with a material with a high atomic number.

9. A pneumatic tire as set forth in claim 8 wherein said body has an X-ray opaque cord lying along a circumferentially extending center line of the crown portion of the tire making an acute angle with said cords.

10. A pneumatic tire comprising an annular body of rubber-like material having a central tread portion, edge beads and sidewalls; said body having an inner ply and an outer ply, one of said plies having cords therein crisscrossing the cords of the other of said plies; and certain ones of said cords in each of said plies being soaked with a lead compound to provide means for indicating the angular disposition of said cords.

11. A pneumatic tire as set forth in claim 10 wherein said soaked cords are impregnated with a tell-tale color to visually identify the edges of said lead soaked cords.

References Cited

UNITED STATES PATENTS

| | | | |
|---|---|---|---|
| 2,475,199 | 7/1949 | Reynolds | 152—359 X |
| 2,575,249 | 11/1951 | Connell | 152—359 |
| 3,232,330 | 2/1966 | Pals | 152—330 |
| 3,233,647 | 2/1966 | Newell | 152—330 |
| 3,261,388 | 7/1966 | Kovac | 152—330 |
| 3,382,907 | 5/1968 | Hough | 152—330 |

GEORGE E. LOWRENCE, Primary Examiner

U.S. Cl. X.R.

152—359